United States Patent
Liu et al.

(10) Patent No.: US 12,455,166 B2
(45) Date of Patent: Oct. 28, 2025

(54) INERTIAL SENSOR

(71) Applicant: Jiangsu XCMG State Key Laboratory Technology Co., Ltd., Xuzhou (CN)

(72) Inventors: Huijuan Liu, Xuzhou (CN); Huan Zhang, Xuzhou (CN); Adin Basic, Xuzhou (CN)

(73) Assignee: Jiangsu XCMG State Key Laboratory Technology Co., Ltd., Jiangsu (CN)

( * ) Notice: Subject to any disclaimer, the term of this patent is extended or adjusted under 35 U.S.C. 154(b) by 289 days.

(21) Appl. No.: 18/194,159

(22) Filed: Mar. 31, 2023

(65) Prior Publication Data

US 2024/0125601 A1 Apr. 18, 2024

(30) Foreign Application Priority Data

Oct. 14, 2022 (CN) .......................... 202211261053.X

(51) Int. Cl.
G01C 21/16 (2006.01)
G01C 25/00 (2006.01)

(52) U.S. Cl.
CPC ......... G01C 21/183 (2020.08); G01C 25/005 (2013.01)

(58) Field of Classification Search
CPC ..... G01C 21/183; G01C 21/16; G01C 25/005
See application file for complete search history.

(56) References Cited

U.S. PATENT DOCUMENTS

| | | | |
|---|---|---|---|
| 2020/0011669 A1* | 1/2020 | Seth | G01C 21/188 |
| 2021/0072278 A1* | 3/2021 | Horton | G01C 21/18 |
| 2021/0215483 A1* | 7/2021 | Krone | G01S 19/14 |
| 2022/0057426 A1* | 2/2022 | Hiyoshi | G01C 21/16 |
| 2023/0228786 A1* | 7/2023 | Otani | G01P 15/08 73/488 |

FOREIGN PATENT DOCUMENTS

| | | | |
|---|---|---|---|
| CN | 212903234 U | * | 4/2021 |
| CN | 215494713 U | | 1/2022 |
| CN | 217483542 U | | 9/2022 |

OTHER PUBLICATIONS

Office Action and Search Report for Chinese Application No. 202211261053.X, by Jiangsu XCMG National Heavy Machinery Laboratory Technology Co., Ltd., mailed May 10, 2025; 14 pages (with English Translation).

\* cited by examiner

*Primary Examiner* — Michael J Zanelli
(74) *Attorney, Agent, or Firm* — Cooley LLP

(57) ABSTRACT

This disclosure relates to an inertial sensor, and to the field of embedded designs. The inertial sensor includes at least one inertial measurement unit; a controller configured to read measurement data of the at least one inertial measurement unit, wherein the at least one inertial measurement unit is couplable to or decouplable from the controller; and a plurality of sets of interfaces, wherein each set of interfaces has a first end electrically connected with the controller and a second end electrically connected with one of the at least one inertial measurement unit.

20 Claims, 4 Drawing Sheets

INERTIAL SENSOR

CROSS-REFERENCE TO RELATED APPLICATIONS

The present disclosure is based on and claims priority of Chinese application for invention No. 202211261053.X, filed on Oct. 14, 2022, the disclosure of which is hereby incorporated into this disclosure by reference in its entirety.

TECHNICAL FIELD

This disclosure relates to the field of embedded designs, and particularly, to an inertial sensor.

BACKGROUND

An inertial sensor is a sensor for measuring data of acceleration, inclination, impact, vibration, rotation and multiple-degree-of-freedom motion of a measured object, and is an important device for solving navigation, orientation and motion carrier control. An inertial measurement unit (IMU), including a gyroscope and an accelerometer, is used for measuring triaxial attitude angles (or angular speed) and acceleration of an object, and is a core element in many inertial sensor (e.g., dynamic angle sensor) systems.

Currently, a controller (e.g., an MCU (Microcontroller Unit) and an inertial measurement unit in the inertial sensor are integrated on a same chip, and data of the inertial measurement unit is read and processed by the controller.

SUMMARY

According to a first aspect of the present disclosure, there is provided an inertial sensor, comprising:
  at least one inertial measurement unit;
  a controller configured to read measurement data of the at least one inertial measurement unit, wherein the at least one inertial measurement unit is couplable to or decouplable from the controller; and
  a plurality of sets of interfaces, wherein each set of interfaces has a first end electrically connected with the controller and a second end electrically connected with one of the at least one inertial measurement unit.

In some embodiments, the plurality of sets of interfaces comprises a first interface, wherein the at least one inertial measurement unit comprises a first inertial measurement unit, and wherein:
  in a first state, the second end of the first interface is connected with the first inertial measurement unit; and
  in a second state, the second end of the first interface is separated from the first inertial measurement unit and electrically connected with a newly added second inertial measurement unit other than the at least one inertial measurement unit.

In some embodiments, wherein the inertial sensor further comprises one or more sets of reserved interfaces, each set of reserved interfaces comprises a first end and a second end, and the first end of each set of reserved interfaces is electrically connected with the controller, and wherein:
  under a first specified condition, the second end of the one or more sets of reserved interfaces is not electrically connected with any of the at least one inertial measurement unit; and
  under a second specified condition, the second end of at least one set of the one or more sets of reserved interfaces is electrically connected with a newly added inertial measurement unit other than the at least one inertial measurement unit.

In some embodiments, the plurality of sets of interfaces are in a two-sided pin structure, the first ends of the plurality of sets of interfaces being one side of the two-sided pin structure, the second ends of the plurality of sets of interfaces being the other side of the two-sided pin structure.

In some embodiments, the at least one inertial measurement unit comprises a plurality of inertial measurement units of different types.

In some embodiments, the controller is further configured to:
  in a chip select mode, select part of measurement data from the read measurement data of the plurality of inertial measurement units for processing.

In some embodiments, the controller is further configured to:
  in the chip select mode, periodically select measurement data of inertial measurement units of different types from the read measurement data of the plurality of inertial measurement units for processing.

In some embodiments, the controller is further configured to:
  in a non-chip select mode, process the read measurement data of the plurality of inertial measurement units.

In some embodiments, the controller is further configured to:
  determine whether to enter the chip select mode according to whether a plurality of sets of measurement data are read.

In some embodiments, the controller comprises:
  a communication module configured to determine a communication protocol of the controller according to a communication protocol of the at least one inertial measurement unit electrically connected to the second ends of the plurality of sets of interfaces.

In some embodiments, the communication module is further configured to:
  modify the communication protocol of the controller under the condition that the at least one inertial measurement unit connected to the second ends of the plurality of sets of interfaces is replaced.

In some embodiments, the controller comprises:
  a driving module configured to read the measurement data of the at least one inertial measurement unit connected to at least one set of the plurality of sets of interfaces; and
  a data processing module configured to process the measurement data of the at least one inertial measurement unit.

In some embodiments, the controller is further configured to: encrypt and store programs of the driving module and the data processing module.

In some embodiments, the controller further comprises:
  an output module configured to output at least one of the measurement data or a processing result of the measurement data.

In some embodiments, the output module is further configured to:
  communicate with the driving module through a serial peripheral interface communication protocol or a controller area network communication protocol.

In some embodiments, the each set of interfaces comprises a communication interface and a power supply interface, the communication interface comprising an inter-integrated circuit interface and a serial peripheral interface, the controller being further configured to:

read the measurement data of the at least one inertial measurement unit via at least one of the inter-integrated circuit interface or the serial peripheral interface.

In some embodiments, the controller is further configured to:

according to the measurement data, determine angular velocities and accelerations of an x-axis, a y-axis and a z-axis of a measured object, which are measured by the at least one inertial measurement unit; and according to the angular velocities and the accelerations of the x axis, the y axis and the z axis of the measured object, determine roll and pitch of the measured object.

In some embodiments, the controller comprises a clock circuit, a program download circuit, a serial communication circuit, and a first power supply circuit; and the at least one inertial measurement unit comprises a filter circuit and a second power supply circuit.

BRIEF DESCRIPTION OF THE DRAWINGS

The accompanying drawings, which constitute a part of this specification, illustrate embodiments of the present disclosure and together with the description, serve to explain the principle of the present disclosure.

The present disclosure can be more clearly understood according to the following detailed description and with reference to the accompanying drawings, in which.

DETAILED DESCRIPTION

Figure 1:
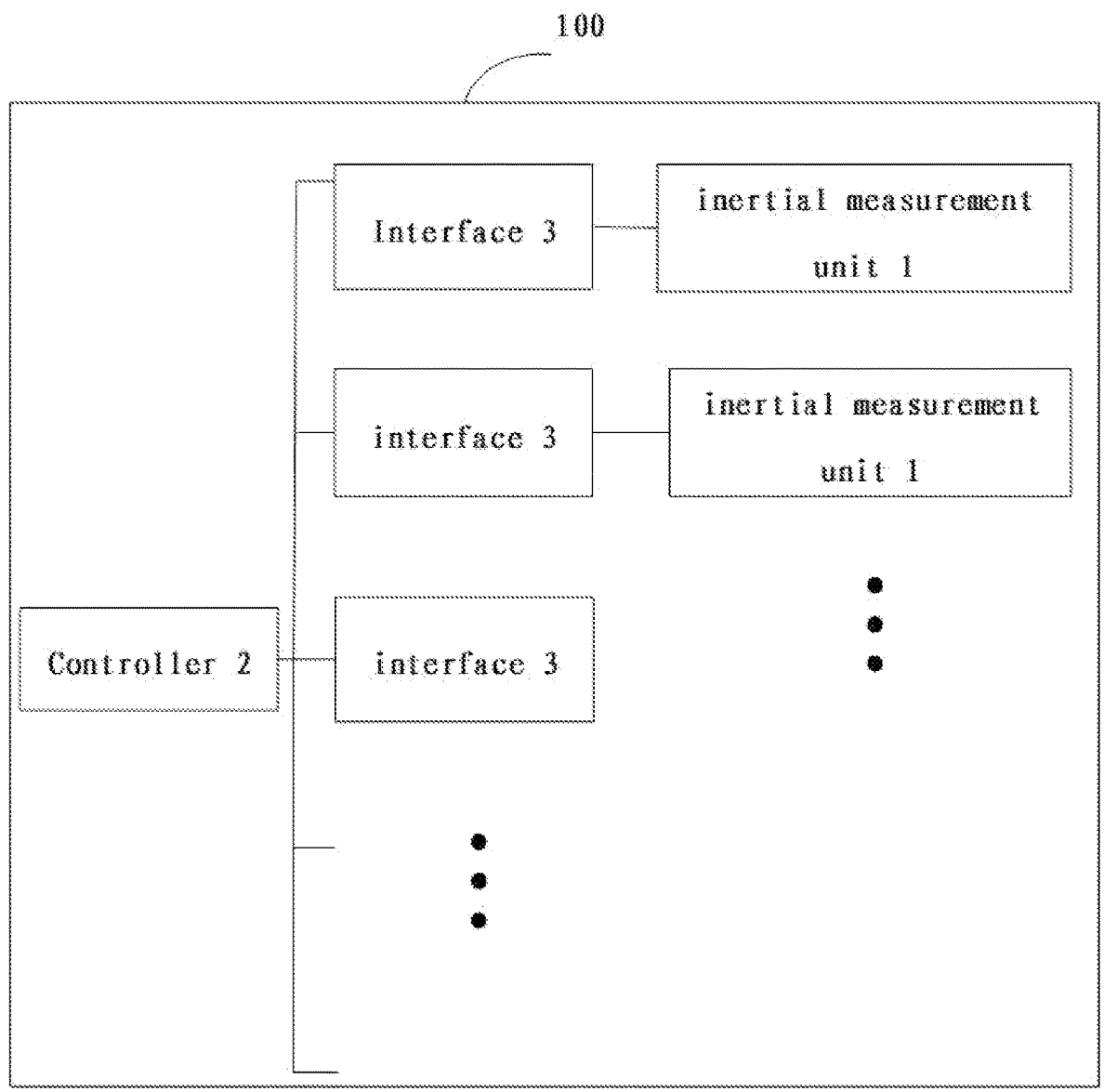
FIG. 1 illustrates a block diagram of a sensor according to some embodiments of the present disclosure.

Various exemplary embodiments of the present disclosure will now be described in detail with reference to the accompanying drawings. It should be noted that: relative arrangements, numerical expressions and numerical values of components and steps set forth in these embodiments do not limit the scope of the present disclosure unless specifically stated otherwise.

Meanwhile, it should be understood that a size of each portion shown in the drawings is not drawn to an actual scale for the convenience of description.

The following description of at least one exemplary embodiment is merely illustrative in nature and is in no way intended to limit this disclosure and its application or use.

Techniques, methods, and devices known to one of ordinary skill in the related art may not be discussed in detail but are intended to be part of the specification where appropriate.

In all examples shown and discussed herein, any specific value should be construed as exemplary only and not as limiting. Thus, other examples of an exemplary embodiment may have different values.

It should be noted that: similar reference numbers and letters refer to similar items in the following drawings, and thus, once a certain item is defined in one drawing, it does not need to be discussed further in subsequent drawings.

In the related art, development of an angle (inertial) sensor is realized by using single MEMS (Micro Electro Mechanical System) hardware, which is fixed in hardware, software and performance, and does not support software and hardware design of decouplable configuration.

A controller (e.g., microcontroller unit) and a single type of inertial measurement units in the inertial sensor are integrated on a same chip. On the one hand, since the two are integrated together, it is difficult to replace the inertial measurement unit of the inertial sensor when the inertial sensor is used. On the other hand, since the inertial sensor adopts the single type of inertial measurement units, few types of data can be measured, and data processing is simple. For example, in a scene such as automatic driving, if abnormal situations such as impact and vibration occur, a single type of inertial measurement units will cause misjudgments of vehicle attitude, which directly affects performance and operation stability of the whole vehicle, and even brings about an operation accident in a severe case.

In addition, due to cost limitation, in a low-end sensor product, a high-performance inertial measurement unit is often not used, but a consumer-grade inertial measurement unit with low cost and relatively low precision is fixedly provided, and the inertial measurement unit is difficult to be replaced, so that when a higher-performance inertial measurement unit is required, it is difficult to replace the inertial measurement unit.

In a word, the current angle sensor in which the inertial measurement unit is integrated is built on the basis of the single controller and the single inertial measurement unit, so that the requirements of angle sensors with different performances and different demands cannot be met. In a stage of product selection, screening is made only according to product specification, and actual verification cannot be performed, thus there is a risk of wrong selection.

The present disclosure provides an inertial sensor, which realizes replacement of an inertial measurement unit 1 on the inertial sensor by supporting decouplable configuration between the inertial measurement unit 1 and a controller.

FIG. 1 illustrates a block diagram of a sensor according to some embodiments of the present disclosure.

As shown in FIG. 1, an inertial sensor 100 comprises at least one inertial measurement unit 1, a controller 2, and a plurality of sets of interfaces 3.

The inertial measurement unit 1 is configured to measure at least one of an angular velocity or an acceleration of an object.

The controller 2 is configured to read measurement data of the at least one inertial measurement unit 1, wherein decouplable configuration is supported between the controller 2 and the inertial measurement unit 1. That is to say, the inertial measurement unit 1 is selectively couplable to or decouplable from the controller 2. The supporting decouplable configuration between the controller 2 and the inertial measurement unit 1 comprises the controller 2 and the inertial measurement unit 1 being separable.

For example, the controller 2 is an MCU. The controller 2 reads the data measured by the inertial measurement unit 1 through the interface, and performs data processing to determine an attitude of the object. The decouplable configuration is supported between the controller 2 and the inertial measurement unit 1, so that different inertial measurement units 1 are replaced.

The plurality of sets of interfaces 3 have a first end electrically connected with the controller 2 and a second end electrically connected with one inertial measurement unit 1.

For example, the interface 3 is used for adaptation between the inertial measurement unit 1 and the controller 2. The interface 3 for adaptation realizes physical connection between the inertial measurement unit 1 and the controller 2, and the inertial measurement unit 1 and the controller 2 communicate through the connection to the same interface 3.

The plurality of inertial measurement units 1 are configured correspondingly according to requirements on the sequence of the connection interfaces. Meanwhile, ports of the inertial measurement units 1 are arranged according to port positions and modes of the connection interfaces 3, to ensure normal connection between the ports of the inertial measurement units 1 and the ports of the interfaces 3.

The controller 21 serves as an inner-layer circuit, which is fixed and needs no modification when the inertial measurement unit 1 is replaced.

A circuit of the inertial measurement unit 1 is an outer-layer configurable circuit so that when an inertial measurement unit 1 is newly added, the circuit of the inertial measurement unit 1 is adaptively modified according to the controller 2 of the inertial sensor 100.

The inertial sensor 100 is designed with a two-layer PCB (Printed Circuit Board), in which the inner-layer (the inertial measurement unit 1) and outer-layer circuits (the controller 2) are independently designed respectively, and an electrical connection is formed between the two through the connection interface 3, so that independence between the inertial measurement unit 1 and the controller 2 is guaranteed. When the inertial measurement unit 1 module is replaced, for the newly added inertial measurement unit 1, only a peripheral interface design of its PCB is modified. For example, only a power supply circuit and a communication circuit of the inertial measurement unit 1 itself are modified to achieve the decouplable configuration of the inertial measurement unit 1 and the controller 2.

According to some embodiments of the present disclosure, the controller 2 and the inertial measurement unit 1 are connected through the interface, and the decouplable configuration is supported between the two. According to the requirements of a developer in development and test of the inertial sensor 100, or the requirements of a user in formal use of the inertial sensor 100, a variety of inertial measurement units 1 are matched through a pre-constructed software and hardware architecture. According to the present disclosure, the inertial measurement unit 1 can be more easily and quickly replaced to modify the current inertial sensor 100 to an inertial sensor 100 of a different type.

When a higher-performance inertial measurement unit 1 is required, only inertial measurement units 1 of a low-end sensor product are replaced, without further purchasing another inertial sensor product, so that tests of inertial measurement units with various prices are realized on the low-end sensor product. In a selection process of inertial measurement units or in a development process of an inertial sensor with multiple performance levels, compatibility of a variety of inertial measurement units is realized, and the design of corresponding angle sensor with different performance levels is realized.

In a word, the inertial sensor of the present disclosure supports a variety of inertial measurement units, realizes serialized development of the inertial sensor, and is suitable for different scenes.

In some embodiments, the plurality of sets of interfaces comprises a first interface, and the at least one inertial measurement unit 1 comprises a first inertial measurement unit 1, wherein in a first state, the second end of the first interface is connected with the first inertial measurement unit 1; and in a second state, the second end of the first interface is separated from the first inertial measurement unit 1 and electrically connected with a newly added second inertial measurement unit 1 other than the at least one inertial measurement unit 1.

For example, the first interface and the inertial measurement unit 1 are designed to be separable, and when the inertial measurement unit 1 needs to be replaced, the first inertial measurement unit 1 that needs to be replaced is taken down from the second end of the interface being connected, and a new second inertial measurement unit 1 is connected to the interface, so as to complete modification of the hardware connection.

In some embodiments, the inertial sensor 100 further comprises one or more sets of reserved interfaces, each set of reserved interfaces comprises a first end and a second end, and the first end of each set of reserved interfaces is electrically connected with the controller 2, wherein under a first specified condition, the second end of the one or more sets of reserved interfaces is not electrically connected with any of the at least one inertial measurement unit 1; and under a second specified condition, the second end of at least one set of the one or more sets of reserved interfaces is electrically connected with a newly added inertial measurement unit 1 other than the at least one inertial measurement unit 1.

For example, one or more sets of reserved interfaces are reserved on the sensor. In a redundancy mode or chip select mode, if two or more sets of inertial measurement units 1 need to be used, the reserved interfaces are enabled. The first specified condition is that the reserved interface is in an idle state, and under the second specified condition (for example, a newly added inertial measurement unit 1 is required), the newly added inertial measurement unit 1 is electrically connected to the reserved interface, so that communication between the newly added inertial measurement unit 1 and the controller 2 is realized.

In some embodiments, the plurality of sets of interfaces are in a two-sided pin structure, the first ends of the plurality of sets of interfaces being one side of the two-sided pin structure, the second ends of the plurality of sets of interfaces being the other side of the two-sided pin structure.

For example, the plurality of sets of interfaces comprise a double-row pin structure in symmetry, so that symmetry and stability of the interface structure are ensured. The double-row pin structure has one end connected with the controller 2 and the other end connected with the inertial measurement unit 1.

In some embodiments, the each set of interfaces comprises a communication interface and a power supply interface, the communication interface comprising an inter-integrated circuit interface and a serial peripheral interface. The controller 2 reads the measurement data of the at least one inertial measurement unit 1 via at least one of the inter-integrated circuit interface or the serial peripheral interface.

Figure 2:
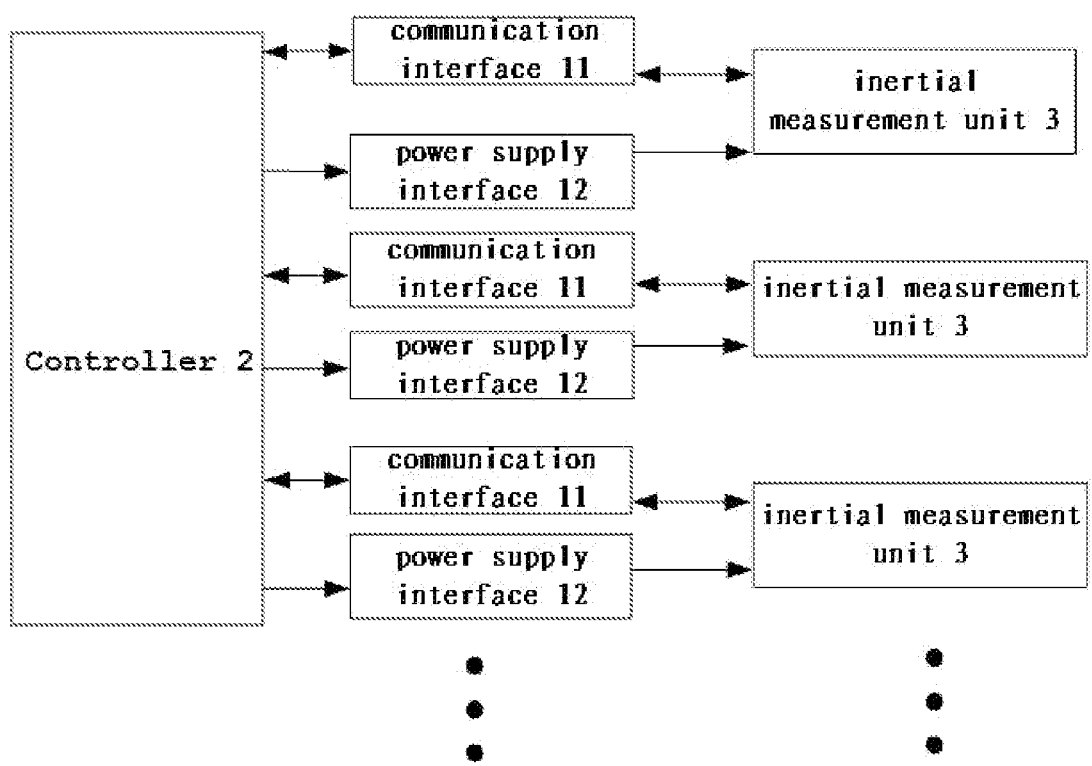
FIG. 2 illustrates a schematic diagram of interfaces according to some embodiments of the present disclosure.

FIG. 2 illustrates a schematic diagram of interfaces according to some embodiments of the present disclosure.

As shown in FIG. 2, each set of interfaces comprises a communication interface and a power supply interface, each communication interface comprising a set of I2C (Inter-Integrated Circuit) communication interfaces and a set of SPIs (Serial Peripheral Interface). The communication interface and the power supply interface of the same set are connected with the same inertial measurement unit 1.

According to some embodiments of the present disclosure, by setting different types of communication interfaces, different communication modes between the inertial measurement unit 1 and the controller 2 are supported, so that the flexibility of communication is improved.

In some embodiments, the at least one inertial measurement unit 1 comprises a plurality of inertial measurement units 1 of different types.

For example, the plurality of inertial measurement units 1 of different types are respectively connected to respective interfaces, and the inertial sensor 100 is compatible with the plurality of inertial measurement units 1 of different types at the same time for communication.

The plurality of sets of interfaces 3 of the present disclosure can all be electrically connected with the inertial measurement units 1 of different types, so that: the plurality of inertial measurement units 1 of different types are employed on the same inertial sensor 100. That the inertial sensor 100 is compatible with the plurality of inertial measurement units 1 of different types means that more types of data are measured, more complex data processing is achieved, and the accuracy of judgment of object attitude is improved.

In some embodiments, it is determined whether time-sharing chip select mode is required according to the requirements of the user. For example, in a product test stage, especially in a fixed working scene, if the use of a certain inertial measurement unit is not determined, a FLAG of the inertial measurement unit for time-sharing selection is set according to the requirements of the user, to determine whether to enter the time-sharing chip select mode of one inertial measurement unit 1 first and then another inertial measurement unit 1.

In some embodiments, it is determined whether to enter the chip select mode according to whether a plurality of sets of measurement data are read.

For example, after port driving software of a core driving module of the controller 2 is started, it is determined how many sets of measurement data of inertial measurement units there are according to whether there is any new/changed message received. A parameter FLAG is used to identify whether to enter a chip select mode. If a plurality of sets of measurement data are read, the parameter FLAG=1, and the inertial sensor 100 enters the chip select mode. If one set of measurement data is read, the parameter FLAG=0, and the inertial sensor 100 does not enter the chip select mode.

In some embodiments, the controller 2 is further configured to: in a non-chip select mode, process the read measurement data of the inertial measurement unit 1.

Under the condition that there are a plurality of inertial measurement units 1, if the chip select mode is not entered, the controller 2 processes the data of the plurality of inertial measurement units 1 according to a redundancy solution. That is, the controller 2 processes the data of the plurality of inertial measurement units 1 at the same time, and calculates all the processing results comprehensively. For example, the processing results of the measurement data of the plurality of inertial measurement units 1 are weighted to obtain a target processing result.

Under the condition that there is only one inertial measurement unit 1, the chip select mode will not be entered, and only the data of the one inertial measurement unit 1 needs to be processed.

According to some embodiments of the present disclosure, in the redundancy solution mode, the measurement data of the plurality of inertial measurement units 1 are integrated, and the processing results of the plurality of inertial measurement units 1 are integrated, so that the accuracy of the measurement of the object motion data is improved.

In some embodiments, the controller 2 is further configured to: in the chip select mode, select part of measurement data from the read measurement data of the plurality of inertial measurement units 1 for processing.

For example, if the inertial sensor 100 is in the chip select mode, the controller 2 selects one from the plurality of inertial measurement units 1 of different types each time, and processes its measurement data. The inertial sensor 100 of the present disclosure supports the use of the inertial measurement units 1 of different types at different times and processes their data. Compared with the non-chip select mode, in the chip select mode, only data of a part of the inertial measurement units 1 is selectively processed, thereby further achieving the decouplable of the controller 2 and the inertial measurement unit 1.

In a test scene, the chip select mode enables rapidly obtaining performances of the inertial measurement units of different types directed to a scene working condition. If the performances of the inertial measurement units of different types are the same, then the redundancy solution mode is set, and a plurality of inertial measurement units are selected for mutual verification. If the performances of the inertial measurement units of different types are different, the non-chip select mode is entered, or only a part of the inertial measurement units is selected.

In some embodiments, in the chip select mode, measurement data of the inertial measurement units 1 of different types are periodically selected from the read measurement data of the plurality of inertial measurement units 1, for processing.

For example, the controller 2 of the inertial sensor 100 selects different inertial measurement units 1 in a time-sharing manner and in turn and processes their data. Compared with the non-chip select mode, in the chip select mode, data of the different inertial measurement units 1 are processed at different times, which realizes testing the inertial measurement units 1 of different types respectively, thereby improving the compatibility of the inertial sensor 100.

In addition, in the chip select mode, that the controller processes measurement data of the plurality of inertial measurement units 1 of different types in turn means that it has more different data sources, rather than merely depending on a certain type of inertial measurement units 1. Under the condition that a single type of inertial measurement units 1 are not suitable for certain scenes, the chip select mode integrates the measurement data of the plurality of inertial measurement units 1 of different types and has a higher fault tolerance rate for the inertial measurement units 1, so that the accuracy of the measurement of the object attitude is improved.

Figure 3:
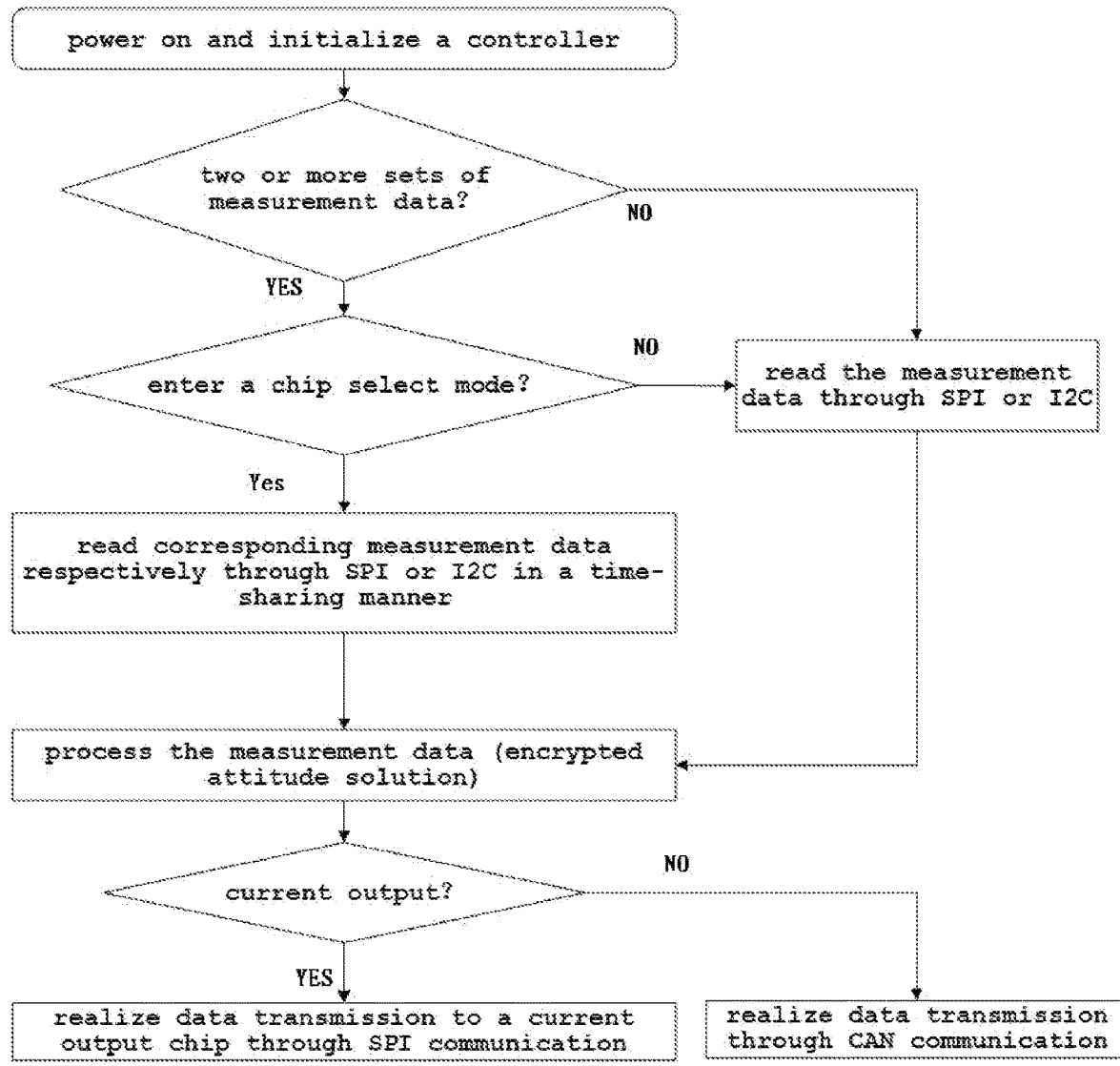
FIG. 3 illustrates a schematic diagram of data processing by a controller according to some embodiments of the present disclosure.

FIG. 3 illustrates a schematic diagram of data processing by a controller 2 according to some embodiments of the present disclosure.

As shown in FIG. 3, the controller 2 is first powered on and initialized. After the initialization is completed, it is determined whether there are more than two sets of inertial measurement units 1 through a communication read enable signal (handshake signal) FLAG.

Then, by means of communication between the controller 2 and the inertial measurement unit 1, acquisition of data of the inertial measurement unit 1 is completed in an SPI or I2C mode. If there are data of more than two sets of inertial measurement units 1, proceed to determine whether the chip select mode needs to be entered. If the chip select mode is entered, data of different inertial measurement units 1 are acquired according to the time-sharing requirement, and data of respective inertial measurement units 1 are selected in a time-sharing manner, and the data are read and processed. If the chip select mode is not entered, the data of the plurality of inertial measurement units 1 are processed by adopting a redundancy solution and the like.

If there are only data of one set of inertial measurement units 1, the data of the one set of inertial measurement unit 1 are directly read and processed.

In the data processing section, the controller 2 performs attitude calculation by calling an encrypted lib file, to output biaxial angle values (pitch and roll) of the measured object.

Finally, the controller 2 determines whether a current output is required, and outputs a sensor signal to an external device according to the requirements of the output signal type. For example, the controller 2 can transmit data to a current output chip through an SPI communication protocol, and can also realize data transmission directly through a CAN (Controller Area Network) communication mode.

In some embodiments, the controller 2 is further configured to: according to the measurement data, determine angular velocities and accelerations of an x-axis, a y-axis and a z-axis of the measured object which are measured by the inertial measurement unit 1; and according to the angular velocities and the accelerations of the x-axis, the y-axis and the z-axis of the measured object, determine roll and pitch of the measured object.

For example, according to the angular velocities and accelerations of the x-axis, the y-axis, and the z-axis of the measured object in the measurement data, the controller 2 calculates biaxial angles of the object, including: roll and pitch.

In some embodiments, the controller 2 comprises: a communication module configured to determine a communication protocol of the controller 2 according to a communication protocol of the at least one inertial measurement unit 1 electrically connected to the second ends of the plurality of sets of interfaces.

For example, according to the communication protocol of the inertial measurement unit 1, the communication protocol of the controller 2 is determined to ensure normal communication between the controller 2 and the inertial measurement unit 1. In addition, the communication module also modifies communication software to support the decouplable configuration.

In some embodiments, the communication module is further configured to: under the condition that the at least one inertial measurement unit 1 connected to the second ends of the plurality of sets of interfaces is replaced, modify the communication protocol of the controller 2.

For example, the communication module of the controller 2 is adjustable. After the inertial measurement unit 1 is modified or newly added, the communication protocol of the communication module of the controller 2 can be modified correspondingly to adapt to the modified or newly added inertial measurement unit 1.

In some embodiments, the communication module comprises at least one of: an I2C1 communication driving module (MCUi2c1.c), an SPI1 communication driving module (MCUspi1.c), an I2C2 communication driving module (MCUi2c2.c), an SPI2 communication driving module (MCUspi2.c), a CAN communication driving module (1MCUcan.c), or an SPI3 communication driving module (1MCUspi3.c).

In some embodiments, the controller 2 comprises: a driving module configured to read the measurement data of the at least one inertial measurement unit 1 connected to at least one set of the plurality of sets of interfaces; and a data processing module configured to process the measurement data of the at least one inertial measurement unit 1. In some embodiments, the controller 2 being further configured to encrypt and store programs of the driving module and the data processing module.

For example, the driving module and the data processing module are modules which are encrypted and packaged and support inner-layer solution and filtering, and their programs and/or files are all packaged into files in formats of "inertial measurement unit 1 cc.lib", "**.c" or the like, and can be compiled but not modified. That is, the data processing module, as a core for attitude solution, is encrypted.

When the inertial sensor 100 works, only files such as "inertial measurement unit 1 cc.lib", ".c" or the like need to be called. Even if the inertial measurement unit 1 of the inertial sensor 100 is replaced, it is not needed to modify the driving module and the data processing module. When the inertial sensor 100 is used, it is not needed to know underlying code of the driving module and the data processing module, which on the one hand, improves the usability of the inertial sensor 100 so that the user more conveniently measures the object using the inertial sensor 100 or develops the inertial sensor 100**, and on the other hand, can effectively prevent leakage of core code to improve confidentiality.

In some embodiments, the inertial measurement unit 1 comprises a data output port module.

Original data output from the data output port module of the inertial measurement unit 1 meets a communication standard required by the controller. That is, the data output from the data output port module of the inertial measurement unit 1 corresponds to input data required by the data processing module of the controller 2. After the inertial measurement units 1 is replaced, the corresponding original data are assigned to parameter for data storage that is specified in the data processing module of the controller 2, to realize the development and use of the sensor.

In some embodiments, the controller 2 further comprises: an output module configured to output at least one of the measurement data or the processing result of the measurement data.

The output module can output the measurement data directly to an external device, such as the angular velocities and accelerations of the three axes (the x-axis, y-axis, and z-axis) of the measured object measured by the inertial measurement unit 1, and can also output the processing result of the measurement data to the external device.

In some embodiments, the output module is further configured to: communicate with the driving module through a serial peripheral interface communication protocol or a controller area network communication protocol.

For example, the output module can comprise a CAN (Controller Area Network) communication circuit or an SPI communication-to-current output signal circuit.

According to some embodiments of the present disclosure, the output module of the controller 2 provides output modes under a variety of communication protocols, and can output the sensor data according to the requirements of the output signal form, so that flexibility of the data output is improved.

In some embodiments, the controller 2 of the inertial sensor 100 comprises a clock circuit, a program download circuit, a first power supply circuit, and a serial communication circuit.

For example, the clock circuit is used for providing an operating frequency for the controller 2. The program download circuit is used for loading a program onto the controller 2. The serial communication circuit is used for receiving and sending serial data, and can perform product debugging, auxiliary test and the like on the inertial sensor 100. The first power supply circuit is used for supplying power to the controller 2.

In some embodiments, the controller 2 comprises a power display circuit, for displaying power information.

In some embodiments, the controller 2 comprises an I2C communication circuit and an SPI communication circuit, for communicating with the inertial measurement unit 1 through different protocols.

In some embodiments, the at least one inertial measurement unit 1 of the inertial sensor 100 comprises a filter circuit and a second power supply circuit.

For example, the filter circuit is used for filtering out ripples in rectified output voltage of the inertial measurement unit 1. The second power supply circuit is used for supplying power to the inertial sensor 100.

Figure 4:
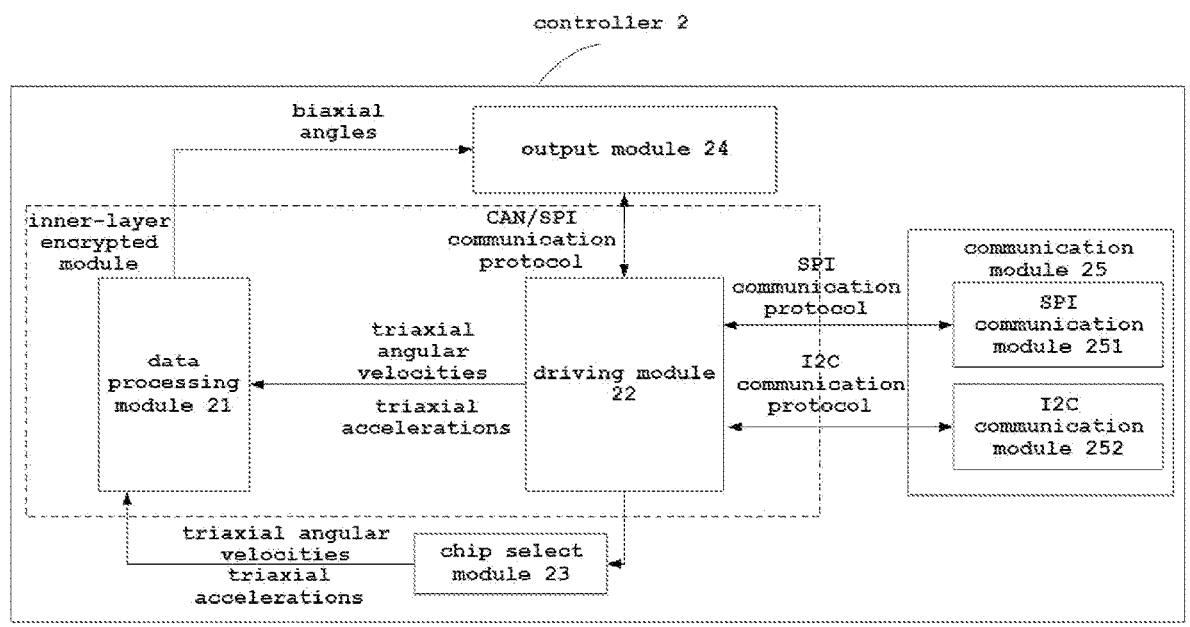
FIG. 4 illustrates a block diagram of a controller according to some embodiments of the present disclosure.

FIG. 4 illustrates a block diagram of a controller 2 according to some embodiments of the present disclosure.

As shown in FIG. 4, the controller 2 comprises a data processing module 21, a driving module 22, a chip select module 23, an output module 24, and a communication module 25. The communication module 25 comprises an SPI communication module 251 and an I2C communication module 252.

The data processing module 21, the driving module 22, the communication module 25 and the output module 24 have been described in detail above, and will not be repeated here.

The SPI communication module 251 and the I2C communication module 252 are used for configuring a communication protocol between the controller 2 and the inertial measurement unit 1.

The chip select module 23 is used for determining whether to enter a chip select mode according to whether a plurality of sets of measurement data are read; and in the chip select mode, the driving module 22 selects, from read measurement data (triaxial accelerations and angular velocities) of a plurality of inertial measurement units 1, part of the measurement data for reading, and sends the part to the data processing module.

In a non-chip select mode, the data processing module 21 reads all the measurement data (the triaxial accelerations and angular velocities) directly from the driving module 22.

The data processing module 21 calculates biaxial angles (pitch and roll) according to the triaxial accelerations and angular velocities.

The output module 24 acquires the biaxial angles of the measured object from the data processing module 21, or acquires the measurement data (triaxial accelerations and angular velocities of the measured object) from the driving module 22 through a CAN/SPI communication protocol, and transmits the acquired data to an external device.

In FIG. 4, the data processing module 21 and the driving module 22 in a dotted box, are both inner-layer encrypted modules, which do not need to be modified even if the inertial measurement unit 1 is replaced. Modules outside the dotted box are outer-layer configurable modules, and can be modified according to a newly added or replaced inertial measurement unit 1.

Through the layered design of the inner-layer and outer-layer modules, the present disclosure can not only provide the encryption processing of the inner-layer core algorithm to ensure the safety of the core technology of the system and reduce modification workload brought by replacing the inertial measurement unit 1, but also support the decouplable between the inertial measurement unit 1 and the controller 2.

Various aspects of the present disclosure are described herein with reference to flow diagrams and/or block diagrams of the inertial sensor 100 according to the embodiments of the present disclosure.

The present disclosure can take a form of an entire hardware embodiment or an embodiment combining software and hardware aspects.

The inertial sensor in the above embodiments can be compatible with the plurality of inertial measurement units of different types, and the inertial measurement unit of the inertial sensor is replaceable.

So far, the inertial sensor according to the present disclosure has been described in detail. Some details well known in the art are not described in order to avoid obscuring the concepts of the present disclosure. Those skilled in the art can fully appreciate how to implement the technical solutions disclosed herein, in view of the foregoing description.

What is claimed is:

1. An inertial sensor, comprising:
   at least one inertial measurement unit;
   a controller configured to read measurement data of the at least one inertial measurement unit, wherein the at least one inertial measurement unit is couplable to or decouplable from the controller;
   a plurality of sets of interfaces, wherein each set of interfaces has a first end electrically connected with the controller and a second end electrically connected with one of the at least one inertial measurement unit; and
   one or more sets of reserved interfaces, each set of reserved interfaces comprising a first end and a second end, the first end of each set of reserved interfaces electrically connected with the controller, wherein:
     under a first specified condition, the second end of the one or more sets of reserved interfaces is not electrically connected with any of the at least one inertial measurement unit; and
     under a second specified condition, the second end of at least one set of the one or more sets of reserved interfaces is electrically connected with a newly added inertial measurement unit other than the at least one inertial measurement unit.

2. The inertial sensor according to claim 1, wherein the plurality of sets of interfaces comprises a first interface, the at least one inertial measurement unit comprising a first inertial measurement unit, and wherein:
   in a first state, the second end of the first interface is connected with the first inertial measurement unit; and
   in a second state, the second end of the first interface is separated from the first inertial measurement unit and electrically connected with a newly added second inertial measurement unit other than the at least one inertial measurement unit.

3. The inertial sensor according to claim 1, wherein the controller comprises:
   a communication module configured to determine a communication protocol of the controller according to a communication protocol of the at least one inertial measurement unit electrically connected to the second ends of the plurality of sets of interfaces.

4. The inertial sensor according to claim 3, wherein the communication module is further configured to:
   modify the communication protocol of the controller under the condition that the at least one inertial measurement unit connected to the second ends of the plurality of sets of interfaces is replaced.

5. The inertial sensor according to claim 1, wherein the controller comprises:
 a driving module configured to read the measurement data of the at least one inertial measurement unit connected to at least one set of the plurality of sets of interfaces; and
 a data processing module configured to process the measurement data of the at least one inertial measurement unit.

6. The inertial sensor according to claim 5, wherein the controller is further configured to:
 encrypt and store programs of the driving module and the data processing module.

7. The inertial sensor according to claim 5, wherein the controller further comprises:
 an output module configured to output at least one of the measurement data or a processing result of the measurement data.

8. The inertial sensor according to claim 7, wherein the output module is further configured to:
 communicate with the driving module through a serial peripheral interface communication protocol or a controller area network communication protocol.

9. The inertial sensor according to claim 1, wherein the each set of interfaces comprises a communication interface and a power supply interface, the communication interface comprising an inter-integrated circuit interface and a serial peripheral interface, the controller being further configured to:
 read the measurement data of the at least one inertial measurement unit via at least one of the inter-integrated circuit interface or the serial peripheral interface.

10. The inertial sensor according to claim 1, wherein the controller is further configured to:
 according to the measurement data, determine angular velocities and accelerations of an x-axis, a y-axis and a z-axis of a measured object, which are measured by the at least one inertial measurement unit; and
 according to the angular velocities and the accelerations of the x-axis, the y-axis and the z-axis of the measured object, determine roll and pitch of the measured object.

11. The inertial sensor according to claim 1, wherein:
 the controller comprises a clock circuit, a program download circuit, a serial communication circuit, and a first power supply circuit; and
 the at least one inertial measurement unit comprises a filter circuit and a second power supply circuit.

12. An inertial sensor, comprising:
 at least one inertial measurement unit;
 a controller configured to read measurement data of the at least one inertial measurement unit, wherein the at least one inertial measurement unit is couplable to or decouplable from the controller; and
 a plurality of sets of interfaces, wherein each set of interfaces has a first end electrically connected with the controller and a second end electrically connected with one of the at least one inertial measurement unit, the plurality of sets of interfaces in a two-sided pin structure, the first ends of the plurality of sets of interfaces being one side of the two-sided pin structure, the second ends of the plurality of sets of interfaces being the other side of the two-sided pin structure.

13. The inertial sensor according to claim 12, wherein the controller comprises:
 a driving module configured to read the measurement data of the at least one inertial measurement unit connected to at least one set of the plurality of sets of interfaces; and
 a data processing module configured to process the measurement data of the at least one inertial measurement unit.

14. The inertial sensor according to claim 12, wherein the each set of interfaces comprises a communication interface and a power supply interface, the communication interface comprising an inter-integrated circuit interface and a serial peripheral interface, the controller being further configured to:
 read the measurement data of the at least one inertial measurement unit via at least one of the inter-integrated circuit interface or the serial peripheral interface.

15. The inertial sensor according to claim 12, wherein the controller is further configured to:
 according to the measurement data, determine angular velocities and accelerations of an x-axis, a y-axis and a z-axis of a measured object, which are measured by the at least one inertial measurement unit; and
 according to the angular velocities and the accelerations of the x-axis, the y-axis and the z-axis of the measured object, determine roll and pitch of the measured object.

16. An inertial sensor, comprising:
 at least one inertial measurement unit;
 a controller configured to read measurement data of the at least one inertial measurement unit, wherein the at least one inertial measurement unit is couplable to or decouplable from the controller; and
 a plurality of sets of interfaces, wherein each set of interfaces has a first end electrically connected with the controller and a second end electrically connected with one of the at least one inertial measurement unit, the at least one inertial measurement unit comprising a plurality of inertial measurement units of different types.

17. The inertial sensor according to claim 16, wherein the controller is further configured to:
 in a chip select mode, select part of measurement data from the read measurement data of the plurality of inertial measurement units for processing.

18. The inertial sensor according to claim 17, wherein the controller is further configured to:
 in the chip select mode, periodically select measurement data of inertial measurement units of different types from the read measurement data of the plurality of inertial measurement units for processing.

19. The inertial sensor according to claim 17, wherein the controller is further configured to:
 in a non-chip select mode, process the read measurement data of the plurality of inertial measurement units.

20. The inertial sensor according to claim 17, wherein the controller is further configured to:
 determine whether to enter the chip select mode according to whether a plurality of sets of measurement data are read.

* * * * *